United States Patent [19]

Waldmann

[11] Patent Number: 5,238,575

[45] Date of Patent: Aug. 24, 1993

[54] ABSORBENT AGENTS FOR CLEAN-UP OF LIQUID HYDROCARBONS

[75] Inventor: John J. Waldmann, Charlotte, N.C.

[73] Assignee: Maxichem, Inc., Charlotte, N.C.

[21] Appl. No.: 650,310

[22] Filed: Feb. 4, 1991

[51] Int. Cl.$^5$ .............................. C02F 1/28
[52] U.S. Cl. ........................ 210/680; 134/7; 210/691; 210/693; 210/924
[58] Field of Search .................... 134/7; 210/680, 691, 210/693, 924

[56] References Cited

U.S. PATENT DOCUMENTS

| | | | |
|---|---|---|---|
| 3,888,766 | 6/1975 | De Young | 210/680 |
| 4,011,175 | 3/1977 | Preus | 210/680 |
| 4,470,912 | 9/1984 | Beall | 210/691 |
| 4,861,491 | 8/1989 | Svensson | 210/691 |

*Primary Examiner*—Ivars Cintins
*Attorney, Agent, or Firm*—Timothy R. Kroboth

[57] ABSTRACT

Liquid hydrocarbon is absorbed from a liquid hydrocarbon-contaminated substrate by a chemical absorbent composition of the formula $A_m B_n C_p$, wherein $A_m$ is an acid leached bentonite, $B_n$ is a modified aminoplast resin, and $C_p$ is a solid hydrophobic material, and wherein at least one of m and n is a positive numerical value. Oil, crude oil, fuel oil, diesel fuel, bunker oil, gasoline, liquid hydrocarbons and synthetic oils may be cleaned up.

19 Claims, No Drawings

ABSORBENT AGENTS FOR CLEAN-UP OF LIQUID HYDROCARBONS

BACKGROUND OF THE INVENTION

It is generally recognized that liquid hydrocarbon contamination of water directly though spills, or indirectly through runoff, or groundwater contamination by soil leaching, is a problem of increasing importance.

In the production, transportation and use of oil, liquid hydrocarbon products such as crude oil, fuels, lubricants, and petrochemicals, there are accidental and intentional releases of liquid hydrocarbon products into the environment. These releases may be large spills such as recent crude oil tanker wrecks, oil pipeline breaks, hydrocarbon contaminated "produced" water from drilling, effluent from metal working or finishing plants, bilge water, "sour" water from gas wells, fuel spills, industrial accidents, etc. In all cases the liquid hydrocarbon products eventually contaminate the environment.

A number of processes are now used or advocated for use in removing liquid hydrocarbons from water and/or solid surfaces. Some are mechanical, others chemical.

Mechanical skimer systems are commonly used when removing oils from water in a contained situation. The use of skimer systems on open water spills has met with limited sucess.

Liquid hydrocarbon removal chemicals consist of dispersants, herders, sinking agents, burning promoters, and absorbants. Chemical systems, like mechanical systems, have met with limited success. The following patents describe a few of the chemical systems:

a) U.S. Pat. No. 3,614,873 proposed cleaning up marine oil spills by freezing the surface layer of oil preferably with particles of dry ice.

b) U.S. Pat. No. 3,785,972 describes a method of removing oil from water surface by increasing the liquidification temperature of oil to 50°–80° F. above the temperature of the water. c) U.S. Pat. Nos. 2,447,551 and 3,959,134 describe a method of removing oil slicks by using dispersant agents consisting of mixtures of $C_{10}$–$C_{20}$ aliphatic carboxylic acids in sorbitan monoesters in combination with nonpolar solvents such as hexyl alcohol, tridecyl alcohol, decanol, heptadecanol, isoparafinic hydrocarbons known as isopar E,G,H,K,L,M, glycol ethers (Exxon Chemical—methyl Jaysolve, ethyl Jaysolve, butyl Jaysolve or diacyl ethers—Exxon Chemical—like Jaysolve DM, Jaysolve E, Jaysolve DB).

d) U.S. Pat. No. 4,551,239 disclose a process called "oil Herder" and appears to use a 1:1 mixture of butylcellusolve and long chain fatty alcohols, $C_{12}$–$C_{15}$.

e) U.S. Pat. No. 3,810,835 describes chemical dispersant agents selected from the class of N,N-dialkyl amide, polyalkylene glycol monoesters of n-alkyl acids and n-alkylene monoesters of ethylene glycol and polyethylene glycol.

f) U.S. Pat. No. 3,869,385 teaches that oil spills on bodies of water are contained by applying polyisocyanate and a polyamine there g) U.S. Pat. No. 3,960,772 describes an adsorbant agent prepared by foaming polyethylene containing 30–80% by weight of atleast one inorganic calcium compound selected from the group consisting of calcium sulfite and calcium carbonate and shaping the substance to have a network structure.

h) U.S. Pat. No. 4,209,382 describes an effective and regenerable oil adsorbant using pitch-like substances, namely oil adsorbants which are using for an ordinary packed layer in a conventional absorbtion separation column. In addition to the prior art the following prior art patents are related to the suject matter of this application: U.S. Pat. Nos. 4,464,603; 4,502,962; 4,597,893; 4,618,450; 4,764,285; 4,732,690; 4,781,207; 4,830,759; 4,834,908; 4,870,127; 4,811,788; 4,978,459 and 4,978,459.

Each of these processes has one or more objection which would be desirable to eliminate.

The invention provides a new and improved process for removal of oil, liquid hydrocarbon from water/or sea water surface and/or solid surfaces. This process may be used wherever it is desirable to absorb oil, liquid hydrocarbon from sea water surface, or water streams and/or solid surface.

The new and improved process can be used for removal of lacquer, paint, or pigment, or their liquid hydrocarbon components, from water streams/or solid surfaces economically, and without deleterious side effects on the environment. The invention provides product(s) which when dispersed on the surface water will absorb the paint(s), pigment, lacquer and their hydrocarbon component(s), leaving "dead" paint products without any further chemical treatment. These products may float or sink after the liquid hydrocarbons from water and/or solid surfaces, or paint(s), or lacquer been absorbed into their "capilarity, or cavities". The term "dead" paint products is synonymous with the paint being "inactivated" or "killed" and means that the paint is no longer "alive", specifically meaning that the paint is no longer sticky or inert. On the contrary, the paint is in a "lifeless" state.

SUMMARY OF THE INVENTION

The present invention provides a process for removing oil, liquid hydrocarbons, or paint(s), lacquer, pigment(s) or their mixture from water and/or solid surfaces.

In accordance with the invention, it has been found that a chemical comprised of a high nitrogen content resin and/or a high silicon dioxide content clay, physically and chemically modified to have a specific gravity of less than one and to be hydrophobic can be used to effectively and economically absorb liquid hydrocarbons, paint(s), lacquer, and/or their mixture(s) from water and/or solid surfaces without negative side effects.

DETAILED DESCRIPTION OF THE INVENTION

The term "Volclay" is common and is defined as siliceous volclay or attapulgite clay which chemically is a hydrous silicate of alumina generated from bentonite acid leached and comprised essentially of the clay mineral montmorillonite, which occupies 10–15 times its dry volume when wetted. This kind of product is available under the tradename "Volclay" Custom Sealant 50, or CS-50.

It has been discovered that low cost compounds having wide use as a chemical absorbant for liquid hydrocarbons, paints, lacquer, and/or their mixture(s) can be prepared from a composition having the formula:

Wherein: $A_m\ B_n\ C_p$ $A_m$ is a siliceous volclay modified by hydrophobic alkyl, N-alkyl-1,3-propane-diamine, having a molecular weight less than 3000, a minimum 12 carbon atoms, preferably higher than 16, and double protonized by acids where the acid is selected from but not limited to a monovalent anion group of $Cl^-, Br^-, I^-, NO_3^-, CH_3COO^-, CH_2COO^-, CH_2(OH)COO^-$, or a mixture of these. The preferable acids are glycolic, glacial acetic acid, or a mixture of these in ratio 1-50:-40-0.4 respectively.

The alkyl hydrophobe amine(s) are stearyl amine, and primary hydrogenated tallow amine, N-alkyl-1,3-propane diamines wherein N-alkyl group may be N-coco, or tallow, or oleyl, or N-s-alkyl ($C_{11}$-$C_{18}$), or their water soluble, or dispersible salts having as the anion group inorganic and/or mono-, di- and tribasic organic acid. The preferably alkyl, or N- alkyl hydrophobe amine is primary hydrogenate tallow amine, or N-tallow-1,3-propane diamine, or their organic acid salt(s), preferable $C_4$-$C_{18}$ acid composition(s), where the acid-amine ratio is 0.05 to 98% by weight(bw).

A necessary ingridient for $A_m$ in the invention is siliceous volclay having the following typical analysis:

| | |
|---|---|
| $SiO_2$ | 53.02% |
| $Al_2O_3$ | 21.08% |
| $FeO_2$ | 3.25% |
| $MgO$ | 2.67% | and a specific gravity=2.0-2.5; pH(5% slurry)=8.5; dry particle size=100% minus 10 mesh, 15% plus 50 mesh, 15% minus 200 mesh. This clay ingredient makes up 50-99% of the $A_m$ compound, by weight.

The siliceous volclay modified by a primary hydrogenated tallow amine, and/or N-tallow-1,3-propane diamine disalt ($C_{16}$ or/and $C_{18}$ as organic acid(s)) is available from Maxichem Inc. under the designation MAXI-THERM-0893RTS/III, or MS-0893.

In $A_m$, m is 0-100% by weight.

$B_n$ is a modified resin made from high nitrogen containing aminoplastic resin. The forming component may be guanidine derivatives such as cyanoguanidine, guanylmelamine, urea, thiourea, N-alkyl, or hydroxy/or hydroxyalkyl-s-triazine-2,4,6 or 2,4 amine, other than melamine, such as melam, melem, and ammeline; substituted melamine such as butyl- or phenyl melamine, guanylmelamine, or guanamines such as acetoguanamine benzoguanamine, tetrahydrobenzoguanamine, steroguanamine, etc. The preferred high nitrogen-containing aminoplast resin-forming compound are dicyandiamide, melamine, guanylmelamine, acetoguanamine, benzoguanamine, urea or a mixture of these. The particular aminoplast-forming reactants used in the invention will depend upon the use of intended for the product.

Example of such aminoplast resin-forming compounds are cyanoguanidine-formaldehyde, melamine-formaldehyde, melamine-glyoxal, or formaldehyde-glyoxal, or a mixture of alkyl/or heterocycle/or aromatic aldehyde(s), cyanoguanidine-melamine-urea-formaldehyde, melamine-urea-glyoxal-formaldehyde which may imployed include formal/or paraformaldehyde, acetaldehyde, butyraldehyde, benzaldehyde, furfurylaldehyde, glyoxal and mixture of two or more aldehyde such as formaldehyde and paraformaldehyde, formal-glyoxal, formaldehyde and acetaldehyde/or benzaldehyde, acetaldehyde and furfurylaldehyde-formaldehyde; benzaldehyde and furfurylaldehyde, and any of the well known aminoplast products on the market. As used in this invention, the high nitrogen aminoplast resin may contain other additives such as polyamine or simple amines having one to six more carbon atoms, an acid catalyst which is a saturated aliphatic water soluble, mono- or poly-carboxylic acid or mixture, thereof.

In $B_n$, n is 0-100% by weight.

Cyanoguanidine-melamine-urea-formaldehyde resin is available from Maxichem, Inc. under the trade names Maxichem P15M and P15MC.

$C_p$ is a solid hydrophobic material in powder form comprised of a mixture of one or more finely divided inorganic compounds such as a siliceous support material modified with one or more silicon compounds such as but not limited to:

1. $(R_1R_2)_3$ Si $(CH_2)_3$ NH $(CH_2)_2$ $NH_2$
2. $(R_1R_2)_3$ Si $(CH_2)_3$ NH $CH_3$
3. gamma-aminopropyltrimethoxysilane
4. polysilane, or silanes of the formula

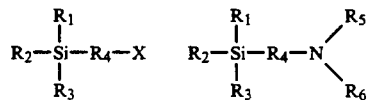

$R_1$, $R_2$, and $R_3$ each may be hydroxy, alkoxy, aryloxy, halogen, or an alkyl or aryl ester, $R_4$ may be a divalent hydrocarbon chain having $C_1$-$C_8$ units per quaternizable X group or a single ary ring, $R_5$ and $R_6$ each maybe hydrogen or a hydrocarbon chain containing $C_1$-$C_4$ units.

5. Petroleum parafinic carboxylate protein products. The most preferable $R_1, R_2$ are methoxy or ethoxy groups and X is halogen, preferable chlorine, in the composition formula at least one of $A_m, B_n, C_p$ is positive.

The siliceous support materials modified by reaction with agents 1 to 4 from 10:0.5-50 ratio and with agents one 1 to 5 from 10:0-3.5 where p=0 to 100% bw.

Products of the preferred $C_p$ composition(s) are available from MAXICHEM, Inc. under designation(s) MAXICHEM-80, MAXICHEM-90 and MAXICHEM-7172.

EXAMPLES OF PREFERED EMBODIMENTS

EXAMPLE 1

In a container of 140 mls water, 1.0 g crude oil was dispersed on the surface of water, followed by 2.0 g of $B_n$ aminoplast resin. The container was closed and mixed on a rotary shaker for 10 minutes. The oil was completely absorbed by the aminoplast resin leaving clean water with no residue of oil or free hydrocarbons on top. It formed solid lumps which floated on the surface and were easily scooped up.

EXAMPLE 2

The procedure is the same as in Example 1 except that the siliceous volclay, $A_m$ was used.

The oil was completely absorbed by the modified clay. It formed solid lumps which left clean water with no residue of oil or free hydrocarbon on top of the water. The lumps formed sank and were easily scooped out. The lumps were kept and agitated in water for 10 days and the oil was not released.

EXAMPLE 3

The procedure was the same as in Example 2 except modified siliceous volclay is incorporated (40% b.w.)

into aminoplast resin (60% b.w.) and expanded together into an inorganic-organic material having:

| | |
|---|---|
| Density (H$_2$) = 1.0) | 0.78 g/cc |
| Appearance | light white-gray, odorless |
| Solubility in water | insoluble |

The oil was completely surrounded and absorbed by the modified material. It formed very thick lumps, floating, leaving clean water with no oil or free hydrocarbon on top of the water even after 10 days in static or agitated water.

The product is of the structure defined as $A_mB_n$ of the general formula (1).

EXAMPLE 4

The procedure was the same as in Example 1 except modified silicondioxide is used such as MAXICHEM-80. The oil was completely surrounded and absorbed, forming very thick lumps which floated leaving clean water with no free oil or hydrocarbon on top. No oil was released back into the water after standing for 10 days.

The modified silicondioxide used was $C_p$.

EXAMPLE 5

The procedure was the same as in Example 2 except that a known modified cationic bentonite was used. The oil was not surrounded and/or absorbed. The oil still floated on the top of the water leaving very dirty water, and the modified bentonite settled on the bottom of the jar.

EXAMPLE 6

The Experoment 5 was repeated except monoprotonized bentonite was used. The oil sticks to the bottom and sides of the jar leaving clean bentonite powder on the bottom.

EXAMPLE 7

The procedure is the same as in Example 4 except silicondioxide was used. The oil was lightly surrounded by silicondioxide and not absorbed. The oil lumps and free oil still floats on the surface of the water.

EXAMPLES 8-11

The procedure was the same as in Example 1 to 4 except artificial sea water was used, the composition of which is as follows

| | |
|---|---|
| Sodium Chloride | 2.65% |
| Magnesium Chloride | 0.24% |
| Mangesium Sulfate | 0.33 |
| Calcium Chloride | 0.11% |
| Potassium Chlroide | 0.07% |
| Sodium Bicarbonate | 0.02% |
| Sodium Bromide | 0.08% |

All four products from Example 1-4 performed in the same way as described in Example 1 to 4.

EXAMPLE 12

In a container of 200 mls water, 0.2 g of formula $A_m$ was dispersed on the surface of the water, followed by 0.2 g of paint and mixed for about 2 minutes. The paint was completely absorbed by the modified clay. It formed solid lump which left clean water with no residue of paint, or free hydrocarbons, and/or chemicals on top of the water. The paint was completely dead and no further neutralization process, or treatment was needed. The lumps formed were easily scooped out, and no tacky properties were observed. The end product is ready for disposal, or incineration.

EXAMPLE 13

The procedure is the same as in Example 12 except that the aminoplast resin $B_n$ was used.

The paint was completely surrounded and absorbed by the modified material. It formed very thick lumps, floating, having clean water, even after 24 hours in static condition or agitated water.

EXAMPLE 14

The procedure is the same as in Example 12 except modified siliceous volclay defined as $A_mB_n$ of Example 3 was used. The lumps formed were easily scooped out, and no tacky properties were observed.

EXAMPLE 15-16

The procedure was the same as in Example 12 except modified cationic bentonite, and monoprotonized bentonite was used. The paint/or chemicals,/or hydrocarbons were not surrounded and/or absorbed completely, had tacky to very tacky properties, leaving very dirty water. The paint used in EXAMPLE 12-16 was paint, or lacquer spray paint, or lacquer spray booth type paint. This is a one step process for detackification of paint, or lacquer paint in water stream.

It is apparent that many widely different embodiments of this invention may be made without departing from the spirit or scope of the invention. Such variations and modifications are meant to be comrehanded within the meaning of the appended claims.

What is claimed is:

1. A method for absorbing liquid hydrocarbon from a liquid hydrocarbon-contaminated substrate comprising applying to said contaminated substrate an effective amount of a chemical absorbent composition of formula:

$$A_mB_nC_p$$

wherein $A_m$ is an acid leached bentonite in a form of hydrous silicate of alumina modified by a hydrophobic alkyl ($C_{12}$-$C_{24}$) amine which has been double protonized by an aliphatic acid with $C_1$-$C_{18}$ carbon atoms in which m=0 to 100% by weight of the composition; $B_n$ is a modified aminoplast resin comprised of cyanoguanidine-melamine-urea-formaldehyde in a foam form in which n is 0 to 100% by weight; and $C_p$ is a siliceous support-modified hydrophobic material in which p is 0 to 100% by weight; provided that at least one of m and n is a positive numerical value.

2. The method of claim 1 wherein the chemical absorbent is applied by spraying and/or spreading it on said contaminated substrate in an amount sufficient to effect the rapid absorption of said liquid hydrocarbon.

3. The method of claim 1 wherein n is positive.

4. The method of claim 3 wherein said modified aminoplast resin is a cyanoguanidine-melamine-urea-formaldehyde with a density range from 0.01 to 0.75 g/cc and n is 40 to 100% by weight.

5. The method of claim 1 wherein p is positive and is a siliceous support-modified with one or more silicone compounds of the group consisting of gamma-aminopropyltrimethoxy silane, $(C_2H_5O)_3$-$Si(CH_2)_3NH(CH_2)_2NH_2$, and $(CH_3O)_3$-$Si(CH_2)_3NHCH_3$, or modified by petroleum paraffinic protein carboxylate product having a density range from 0.05 to 1.0 g/cc.

6. The method of claim 1 wherein the chemical compound $A_m$ is 40-60% by weight and $B_n$ is 60 to 40% by weight in said chemical absorbent.

7. The method of claim 1 wherein said liquid hydrocarbon is crude oil.

8. The method of claim 7, wherein crude oil is removed from a crude oil-contaminated substrate by spraying the chemical absorbent in powder form into the oil under pressure of from about 0 to 551.5 KPa.

9. The method of claim 8, wherein the chemical absorbent is sprayed under pressure of from about 241.3 to 441.4 KPa.

10. The method of claim 1 wherein said liquid hydrocarbon is selected from the group consisting of oil, crude oil, fuel oil, diesel fuel, bunker oil, gasoline, liquid hydrocarbons and synthetic oils.

11. The method of claim 1 wherein said chemical absorbent is used at the rate of from about 0.05 to 5.0 part by weight per 1 part of said liquid hydrocarbon.

12. The method of claim 11 wherein the rate is from about 0.5 to 5.0 parts by weight.

13. The method of claim 1 wherein the chemical absorbant is applied onto a structural material.

14. The method of claim 1 wherein said aliphatic acid with $C_1$-$C_{18}$ carbon atoms is glycolic acid and acetic acid in the ratio of (49-0):(1-50) respectively.

15. The method of claim 1, wherein both m and n are positive numerical values.

16. The method of claim 15, wherein said modified aminoplast resin has a density range from 0.01 to 0.75 g/cc.

17. The method of claim 1, wherein m is a positive numerical value.

18. The method of claim 1, wherein m is a positive numerical value and said hydrophobic alkyl $(C_{12}$-$C_{24})$amine is N-tallow-1,3-propane diamine and said aliphatic acid consists of glycolic acid and acetic acid in the ratio of (49-0):(1-50), respectively.

19. The method of claim 1, wherein m is a positive numerical value, and said hydrophobic alkyl $(C_{12}$-$C_{24})$ amine is selected from the group consisting of primary hydrogenated tallow amines, N-alkyl-1,3-propane diamines wherein the alkyl chain has $C_5$-$C_{18}$ carbon atoms, and their water-soluble or dispersible salts having as an anion group mono-, di-, or tribasic organic acids.

* * * * *